United States Patent
Draca et al.

(10) Patent No.: US 8,037,164 B2
(45) Date of Patent: Oct. 11, 2011

(54) NETWORK SERVICE CONFIGURATION MANAGEMENT

(75) Inventors: Nicolas Draca, Dingsheim (FR); Eric Duchene, Laxou (FR)

(73) Assignee: Infoblox Inc., Santa Clara, CA (US)

( * ) Notice: Subject to any disclaimer, the term of this patent is extended or adjusted under 35 U.S.C. 154(b) by 443 days.

(21) Appl. No.: 12/085,653

(22) PCT Filed: Nov. 29, 2006

(86) PCT No.: PCT/EP2006/011458
§ 371 (c)(1),
(2), (4) Date: May 27, 2008

(87) PCT Pub. No.: WO2007/062826
PCT Pub. Date: Jun. 7, 2007

(65) Prior Publication Data
US 2009/0083400 A1    Mar. 26, 2009

(30) Foreign Application Priority Data
Nov. 29, 2005   (EP) .................................. 05292523

(51) Int. Cl.
*G06F 15/173* (2006.01)
(52) U.S. Cl. ........ 709/223; 709/217; 709/218; 709/219; 709/220; 709/221; 709/225; 709/226; 709/230; 709/248
(58) Field of Classification Search .................. 709/221, 709/248, 220, 217, 218, 219, 223, 225, 226, 709/230
See application file for complete search history.

(56) References Cited

U.S. PATENT DOCUMENTS

| | | | |
|---|---|---|---|
| 5,956,719 A * | 9/1999 | Kudo et al. | 707/610 |
| 6,178,443 B1 * | 1/2001 | Lin | 709/208 |
| 6,526,410 B1 * | 2/2003 | Aoyama et al. | 1/1 |
| 6,883,034 B1 | 4/2005 | Pelavin et al. | |
| 7,275,073 B2 * | 9/2007 | Ganji et al. | 707/621 |
| 7,577,661 B2 * | 8/2009 | Bankston et al. | 1/1 |
| 2003/0212660 A1 * | 11/2003 | Kerwin | 707/1 |
| 2005/0114507 A1 * | 5/2005 | Tarui et al. | 709/224 |
| 2005/0223315 A1 * | 10/2005 | Shimizu et al. | 715/512 |

FOREIGN PATENT DOCUMENTS
EP    1039685    9/2000

OTHER PUBLICATIONS

R. Enns, Ed.. NETCONF Configuration Protocol, Internet-Draft Memo, Sep. 14, 2005, Network Working Group. Choi et al., XML-Based Configuration Management for IP Network Devices, IEEE Communications Magazine, Jul. 2004, pp. 84-91.
Takeuchi et al., A Differential-analysis Approach for Improving SOAP Processing Performance, NTT Data Corporation, Tokyo, 2005 verified from internet.

* cited by examiner

*Primary Examiner* — Liangche A Wang
(74) *Attorney, Agent, or Firm* — Van Pelt, Yi & James LLP

(57) ABSTRACT

The system remotely manages the configuration of one or several network services (20). The management server (10) has access to a database (12) which stores a representation of the configuration of the network service (20). An agent software component (18)—running preferably on the network device providing the managed service (20)—has access to the configuration in the native language of the network service (20). The management server (10) and the agent software component (18) communicate synchronization information to each other and synchronize the representation of the configuration of the network service in the database (12) and the native language configuration of the network service (20) with each other based on the synchronization information. The synchronization information is in a language different from the native language of the configuration of the network service.

11 Claims, 11 Drawing Sheets

NETWORK SERVICE CONFIGURATION MANAGEMENT

FIELD OF THE INVENTION

The invention relates to remote management of the configuration of network services in a network such as an IP network.

BACKGROUND OF THE INVENTION

Effective IP address management is an overall business process issue. The growing network complexity associated with connecting mobile users to a number of disparate resources quickly becomes an enormous IT burden from a workload and cost standpoint. There is a need to make it possible for IT departments to provide high levels of service, rapidly deploy new services, and continue to maintain existing systems, with flat or decreasing budgets and headcount.

In particular, the administration of DNS (Domain Name System) and DHCP (Dynamic Host Configuration Protocol) servers as well as the secure and dynamic management of IP address has become a priority. Further, IP environment administration concerns multiple activities within the IT department and requires extensive IT resources. It implies defining multiple profiles in order to do the job while preserving security and confidentiality. Typically, IP administration tasks are handled manually and can take staffers an average of several weeks per year to complete. So, there is a need for eliminating tedious and time-consuming manual tasks.

To face these needs, IP management software products have been developed such as VitalQIP® of Lucent Technologies™ and IPm™ of Efficient IP™. These software products are run on a server connected to the IP network and make it possible to consolidate all IP address information of the network in a single database and to support DHCP and DNS servers.

However, a drawback of these products is due to the fact that the implementation thereof in existing networks already comprising DNS and DHCP servers is tedious and expensive because they require the replacement of the existing DNS and DHCP software products with specific DNS and DHCP software able to communicate via the network with the IP management software.

SUMMARY OF THE INVENTION

The object of the present invention is to alleviate at least partly the above mentioned drawback.

This object is also achieved with a network service configuration management system for remotely managing the configuration of a network service, comprising:
a management server;
a database;
an agent software component;
wherein:
the database stores a representation of the configuration of the network service;
the management server has access to the database;
the agent software component has access to the configuration in a native language of the network service;
the management server and the agent software component are adapted to communicate synchronization information to each other and to synchronize the representation of the configuration of the network service in the database and the native language configuration of the network service with each other based on the synchronization information, the synchronization information being in a language different from the native language of the configuration of the network service.

Preferred embodiments comprise one or more of the following features:
the network service runs on a network device distinct from the management server
the network service is provided by the network device on which the agent software component is run;
the network service runs on the management server;
the synchronization information defines the differences in configuration between a new state and an older state;
the agent software component is adapted to convert the configuration in native language of the network service into a tree representation;
the agent software component is adapted to make a differential analysis of the configuration in tree representation between a new state and an older state and to provide a stream of elementary operations allowing a tree representation of the configuration in the new state to be built up by applying the stream of elementary operations to the tree representation of the configuration in the older state;
the agent software component is adapted to convert a stream of elementary operations into the language of the synchronization information for communication to the management server;
the agent software component is adapted to convert the configuration of the network service in tree representation into the native language of the network service;
the management server is adapted to communicate to the agent software component synchronization information containing a stream of elementary operations enabling the agent software component to build up the tree representation of the configuration in a new state by applying the stream of elementary operations to the tree representation of the configuration in an older state.

In an advantageous embodiment, the system is designed for remotely managing the configuration of a plurality of network services, and comprises a plurality of agent software components, wherein:
the database stores a representation of the configuration of the plurality of network services;
each agent software component has access to the configuration in native language of a respective network service; and
the management server and each agent software component are adapted to communicate synchronization information to each other and to synchronize the configuration in native language of the respective network service and the representation of the configuration of the respective network service in the database with each other based on said synchronization information, said synchronization information being provided in a language different from the native language of the configuration of the respective network service; and
wherein:
the plurality of network services have different native configuration languages; and
said synchronization information communicated by the management server and the plurality of agent software components is in a same language.

In this latter embodiment, each network service may run either on the management server or on a respective network device distinct from the management server. In the latter case, the network service(s) is preferably provided by the network device running the respective agent software component.

In a further advantageous embodiment, the system also comprises:
- a DNS service provided by a DNS server;
- a DHCP service provided by a DHCP server distinct from the DNS server;
- a software script inserted in the native configuration of the DHCP service and which:
  - reads data in the native configuration of the DHCP service; and
  - computes and records address/name mapping information into the native configuration of the DHCP service based on read data; and
- a software module preferably of the GSS-TSIG type, said software module running on the DHCP server and which:
  - reads the address/name mapping information recorded by the software script in the native configuration of the DHCP service; and
  - sends messages to the DNS service for securely updating it, the messages being computed by the software module based on the read address/name mapping information.

This latter embodiment is particularly advantageous in the case of a DHCP service and a DNS service using an incompatible DNS secured update protocol as it overcomes the incompatibility issue in an efficient way.

According to another aspect, the invention proposes a method for remotely managing the configuration of a network service, comprising the steps of:
- providing a management server having access to a database and storing in the database a representation of the configuration of the network service;
- running an agent software component e.g. on the management server or on a network device distinct from the management server;
- giving the agent software component access to the configuration in native language of the network service;
- causing the management server and the agent software component to communicate synchronization information to each other, the synchronization information being in a language different from the native language of the configuration of the network service; and
- causing the management server and the agent software component to synchronize the representation of the configuration of the network service in the database and the configuration in native language of the network service based on the synchronization information.

According to a preferred embodiment of this method, the agent software component is run on the network device providing the network service.

According to another aspect, the invention proposes a method for remotely managing the configuration of a plurality of network services that employ different native configuration languages, the method comprising the steps of:
- providing a management server having access to a database and storing in the database a representation of the configuration of the plurality of network services;
- running a plurality of agent software components each on either the management or a network device distinct from the management server;
- giving each agent software component access to the configuration in native language of a respective network service;
- causing the management server and each agent software component to communicate synchronization information to each other, the synchronization information communicated by the management server and the plurality of agent software components being in a same language; and
- causing the management server and each agent software component to synchronize the representation of the configuration of the respective network service in the database and the configuration in native language of the respective network service based on the synchronization information communicated to each other.

According to a preferred embodiment of this method, each agent software component is run on the network device providing the respective network service.

According to a further aspect, the invention proposes an agent software component for managing a network service, which when run on a network device providing the network service is adapted to access the configuration in native language of the network service and is further adapted to:
- receive update information from a remote management server and to update the configuration in native language of the network service based on the received update information; and/or
- send update information to a remote management server to enable the management server to update a representation of the configuration of the network service in a database;
wherein the update information is in a language different from the native language of the configuration of the network service.

According to a preferred embodiment, the agent software component is adapted to access the configuration of the network service for different native languages.

According to another aspect, the invention proposes a set of such agent software components, wherein each agent software component is adapted to access the configuration of a network service in a respective native language.

According to a further aspect, the invention proposes a method for securely updating a DNS service run on a DNS server with address/name mapping information available in a DHCP service run on a DHCP server, comprising the steps of:
- inserting a software script in the native configuration of the DHCP service, the software script being adapted to:
  - read data in the native configuration of the DHCP service; and
  - compute and record address/name mapping information into the native configuration of the DHCP service based on read data; and
- running a software module preferably of the GSS-TSIG type, on the DHCP server, the software module being adapted to:
  - read the address/name mapping information recorded by the software script in the native configuration of the DHCP service; and
  - send messages to the DNS service for securely updating it, the messages being computed by the software module based on the read address/name mapping information.

This latter method is particularly advantageous in the case of a DHCP service and a DNS service using an incompatible DNS secured update protocol as this method overcomes the incompatibility issue in an efficient way.

Further features and advantages of the invention will appear from the following description of embodiments of the invention, given as non-limiting example, with reference to the accompanying drawings listed hereunder.

DETAILED DESCRIPTION OF THE INVENTION

Figure 1:
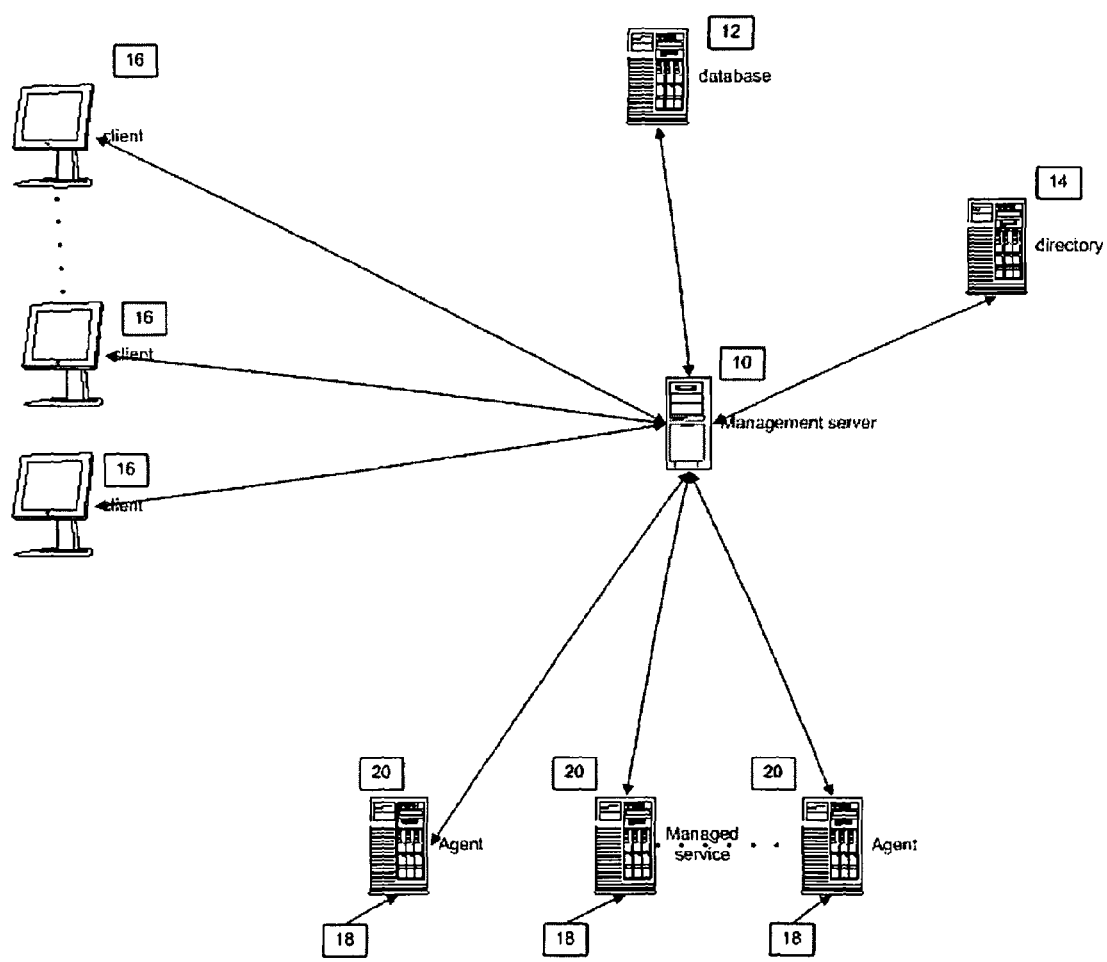
FIG. 1 illustrates a system for managing configurations of services provided in a network according to the invention.

According to the invention, the system for remotely managing the configuration of a network service, comprises a management server, a database, and an agent software component. In the following description, we shall refer to such agent software component as an "agent" for sake of convenience. The agent is run on a network device which is distinct from the management server or on the management server itself. The database stores a representation of the configuration of the network service and the management server has access to the database. The agent is given access to this configuration in native language of the network service. The configuration in the native language is to be understood as the configuration in the form that is fully understandable by the network service using this configuration.

The management server and the agent are adapted to communicate information to each other for synchronizing the representation of the configuration of the network service in the database and the configuration in native language of the network service with each other.

The agent is adapted to handle the native language of this configuration of the network service. But the synchronization information communicated between the management server and the agent uses another language, i.e. a language different from the native language of the network service configuration. Both the agent and the management server are able to handle this other language. So, the agent provides an interface between the management server and the configuration in native language of the network service.

As a result, the management server does not need to be able to handle the native language of the configuration of the network service. As a consequence, the same management server with the database is able to manage any kind of network service independently of the native language of the configuration of the network service as only the agent has to be changed.

Further, the configuration management system can easily be used to manage a plurality of network services—which may have specific native languages for their respective configuration—by assigning to each of them a respective software agent providing the interface with the management server in the way previously described. All the agents preferably communicate with the management server in a same language. This language can advantageously be an abstract language such as XML as it allows easy adaptation of the configuration management system to new types of network services.

The agent is preferably run on the network device, providing the network service whose configuration is managed with the help of this agent.

The configuration management system can be used to synchronize the representation of the configuration of the network service in the database with the configuration in native language of the network service. In this first synchronization direction, the agent is adapted to communicate synchronization information to the management server and the management server is adapted to synchronize the representation of the configuration of the network service in the database with the configuration, in native language, of the network service based on this synchronization information.

The configuration management system can also be used to synchronize the configuration in native language of the network service with the representation of the configuration of the network service in the database. In this second synchronization direction, the management server is adapted to communicate synchronization information to the agent and the agent is adapted to synchronize the configuration in native language of the network service with the representation of the configuration of the network service in the database based on this synchronization information.

The configuration management system may be used both in the first synchronization direction and in the second synchronization direction, thus allowing both to update the database when changes occur locally in the configuration of network services and to change remotely the configuration of network services with the help of the management server. But it is also possible to use the configuration management system only in one synchronization direction, e.g. the first one in which case the system serves only to get a centralized representation of the configuration of the network services.

An embodiment of a system for managing configurations of services provided in a network according to the invention is illustrated in FIG. 1. FIG. 1 does not show the elements of the network that are not directly involved in the configuration management system for sake of convenience.

The network may be of any known type. Classically, a plurality of network client devices are connectable to the network using any appropriate means such as dial-up, DSL line or direct network connection.

The network is made up of nodes which are configured with network addresses and names. In the case of a TCP/IP-based network, addresses and names may be either statically assigned to any node, or dynamically by DHCP service(s). The resolutions between addresses and names are made by DNS service(s), which can be queried by any node of the network.

Each network client device includes software allowing access to services provided either by the client device itself, or by other network client devices via the network. Such software may include a graphical interface i.e. web browsers allowing connection, for example, to any server providing a HTTP service, or command line interfaces known as shells.

As shown in FIG. 1, the configuration management system comprises:

a management server 10;
a database 12;
a directory 14;

at least one client 16;

at least one managed service 20;

a respective agent module 18 for each managed service 20.

Each managed service 20 is a network service typically provided by software run on a network device. A network device may provide one or more network services. Examples of such managed services are those provided by DNS servers and DHCP servers. More generally, a managed service can be any network service which provides network connectivity and control such as routers, switches and more generally any device implementing level 2 or 3 routing protocols. So, a managed service provides network configuration data.

Such network service usually needs a configuration, i.e. a set of data describing how the network service runs, and what service it provides. An example of a network service is a DNS server which provides a name/address resolution service that can be queried with network messages. A typical configuration is a set of data stored in a container such as a text file, a database or any other structured binary container. The container can be accessed by a determined method to read, modify and write data in the configuration of the network service. The configuration container of a network service is stored locally in the network device providing this network service. The configuration container is stored either statically—e.g. on a hard disk or in flash memory—or dynamically which is usually the case of the active configuration stored in system RAM of the network device. It is a common practice in the computer field to distinguish between active and passive configurations. An active configuration is a configuration that is actually in use by a network service. A passive configuration is a configuration that is stored by a network service, but not presently in use. Within the present description, any reference to configuration management also includes the fact of causing the state of a configuration to change to either passive or active.

Management server 10 is remote from the network devices of the managed services 20. Management server 10 remotely manages the configurations of managed services 20 via their respective agent modules 18.

Each agent module 18 is an executable software component loaded on the network device providing the corresponding managed service 20. Management server 10 and each agent module 18 can communicate with each other by any appropriate channel, e.g. via the network itself. Each agent module 18 has access to the configuration storage of the corresponding managed service 20. The access of the agent module to the configuration storage preferably allows both read and write operations, i.e. the agent can read the configuration, and can also modify it.

Management server 10 manages the configurations of managed services 20 based on a standardized representation of these configurations. In other words, the configuration of each managed service is described in a given language whatever the native language of the managed service 20 consists in. For this reason, each agent module 18 is able to convert any configuration of the corresponding managed service 20 both from its form in native language to the standardized representation used by management server 10 and from the standardized representation to its native language form. As already mentioned, a configuration in the native language is to be understood as the configuration in the form that is fully understandable by the managed service 20 using this configuration.

Management server 10 centralizes the configuration in the standardized representation of any managed service 20 in a central repository which is implemented by database 12. Management server 10 is in communication with database 12 by any appropriate channel such as the network itself or a local file system. Database 12 stores the set of configurations of the managed services 20. The set of managed service configurations stored in database 12 describes the addressing scheme of subnets which together form the managed network. Database 12 comprises database software supporting e.g. the SQL language and running on a computer.

The standardized representation is preferably based on the class of service the corresponding managed service 20 provides. For example, when managing TCP/IP configurations, DNS and DHCP configurations are two distinct classes. The fact that the standardized representation is based on the class of service makes possible to easily add new types of services, if required, by defining correspondingly new classes of services.

Management server 10 in cooperation with agent modules 18 provides the possibility to synchronize the local configuration of managed services 20 and the set of managed service configurations stored in database 12 by merging them. The merge operations can be configured so that either database 12 or the local configuration storage of the managed service 20 takes precedence. In other words, management server 10 in cooperation with agent module 18 provides the possibility:

of changing the configuration of a managed service 20 in its native language in the local storage of the corresponding network device based on the configuration of this managed service in database 12; and of updating the configuration of a managed service 20 in database 12 based on the configuration of this managed service 20 in its native language in the local storage of the corresponding network device.

During the synchronization operations, the agent module 18 ensures the conversion of the configuration between its native form and its standardized representation as previously described.

Management server 10 is able to build dynamically and in real time the usage of the resources of the network—in particular, the IP resources in the case of an IP network—such as network node addresses, names and settings based on the set of managed service configurations stored in database 12. In particular, upon each synchronization between the management server and the agent software component, the network address directory modeled by the database 12 represents the network configuration defined by all configurations of the network services.

Management server 10 also allows authorized actors to manage the managed services 20 within the rights they have to do so. Therefore, management server 10 has access to directory 14. Directory 14 is a list of uniquely-defined actors as well as authentication information—such as logins and passwords—and rights assigned to the actors. Actors are individuals or abstract entities, but may also be processes or devices of the network such as computers. Processes are here to be understood as being software processes run on devices such as e.g. agent modules 18. Directory 14 may be contained in database 12, but may also be contained in a separate storage device. In particular, directory 14 can integrate an existing directory such as an LDAP (Lightweight Directory Access Protocol) server or an Active Directory server.

Configurations of managed services 20 are often built upon hierarchical schemes. For example the Internet Protocol (IP) used in network addressing provides a numbering scheme to allow distinguishing between accurately split parts of a network. This splitting is hierarchical in its nature, and can be used as a basis of the security model of the configuration management. Each actor referenced in directory 14 can be assigned the right to access one or more perimeters. A perimeter is a set of network addresses representing a node in the hierarchical order and all its sub-nodes. As a consequence, management server 10 gives each actor the right to manage the configuration of managed services 20 which are included in the perimeter(s) assigned to this actor.

In a more general way, management server 10 may use any hierarchical representation bound to the addressing scheme of the network as a possible perimeter. So, perimeters may e.g. be built upon domain names as defined by DNS services. Perimeters may also be defined by any hierarchical network attribute set defined by management server 10 itself, e.g. by defining a hierarchical attribute list in which any node can be assigned to a network node.

Clients 16 are devices or processes allowing individual actors to communicate—through any appropriate channel such as the Internet or a local network—with management server 10 with a view to managing the managed services 20. A typical client 16 is a device or a process that gives a user an appropriate view of use of the network resources. Examples thereof are a system built from a web browser and a web server, or a command line interface, or a server based GUI.

In order to provide comprehensible and easy scalability, it is preferred that the agent modules 18 and the clients 16 are in communication with management server 10 by making use of known standard protocols up to the OSI transport layer. However a specific protocol may be used for the layers above which can advantageously be modeled using an abstract language, preferably the XML language.

So, any client 16 application developed for the configuration management system—such as web-based interfaces—can make use of its own standard protocol—such as HTTP—and converts it to the XML language. It is obvious to those skilled in the art that any data transport protocol used in today's applications can be easily interfaced with an XML-based protocol.

The language for communication between management server 10 and agent modules 18/clients 16 allows data and command transportation and a specific set of commands is dedicated to the remote control of the agent modules 18. These commands include orders such as system processes control (start, stop, . . . ), remote function calls, reporting, data gathering, remote configuration and any other remote action achievable on the host running the component.

Figure 2:
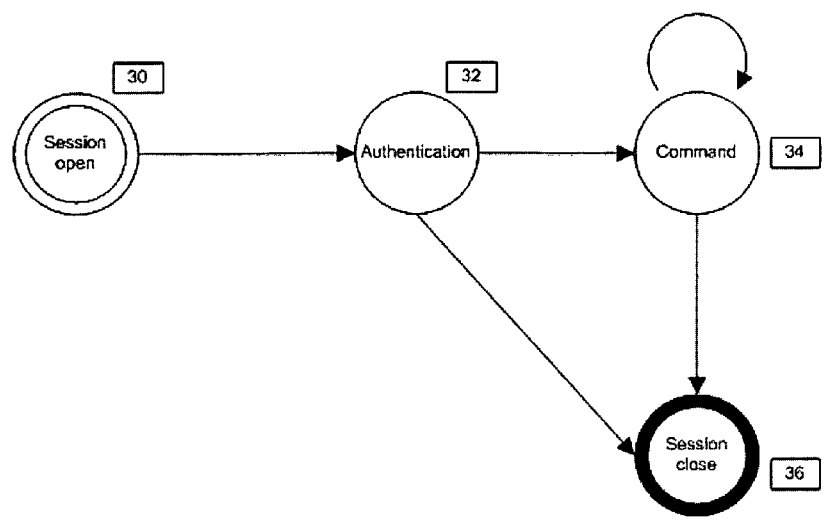
FIG. 2 is a diagram showing the communication states during a connection session to the management server of the management system of FIG. 1.

FIG. 2 shows, in a preferred embodiment, how management server 10 handles communication with agent modules 18 and clients 16. The time between the start and the end of a communication is referred to as a session.

A session is opened—see ref 30—upon the incoming connection of an agent module 18 or a client 16 to management server 10. At this point, management server 10 moves to its authentication state 32, and authorizes only the usage of authentication-related commands. The connecting actor provides credentials that are checked by management server 10. Credentials may be any form of security data uniquely identifying an actor such as, a login/password pair, a secured certificate or a token. Management server 10 checks the credentials based on the information stored in directory 14 specifically for this purpose.

Once its credentials are validated, management server 10 determines the rights and perimeters of the identified actor. Rights are a combination of categories and levels allowing usage of specific commands in the abstract language, each command belonging to one or more category or categories with a specific level. Perimeters and rights computation can be determined from directory 14 which may contain this information as already described. Alternatively, for example, perimeter and rights determination can be performed automatically based on the actor type or credentials. Perimeters and rights are associated with the session and are valid for the session duration only. The session state moves to the command state 34 after the right and perimeter computation.

In the command state 34, management server 10 checks any command provided by the actor to ensure that the command is within the determined rights and perimeters and if so, management server 10 executes the command. The results of execution are transmitted to the actor and include a status. Statuses preferably follow a fixed layout, and allow indication of a variety of result such as error type, warnings, notices and their associated information.

The session close 36 can occur on different events: management server 10 or client 16/agent module 18 may generate a close operation on event such as authentication failure, communication channel failure, prolonged inactive sessions, too many reported errors, or natural end agreement. Management server 10 then moves to the closed state, discards any resources used for the session and finally deletes the session.

To secure the management system, it is preferred that only management server 10 is allowed to interact with agent modules 18. Therefore, each agent module 18 uses any appropriate secured authentication method—or a combination of several of such methods—to make sure that it is management server 10 which is in communication with it such as secret challenge, connexion authorization restricted to the IP address of management server 10, digital certificate assigned to the name or to the IP address of management server 10.

Figure 3:
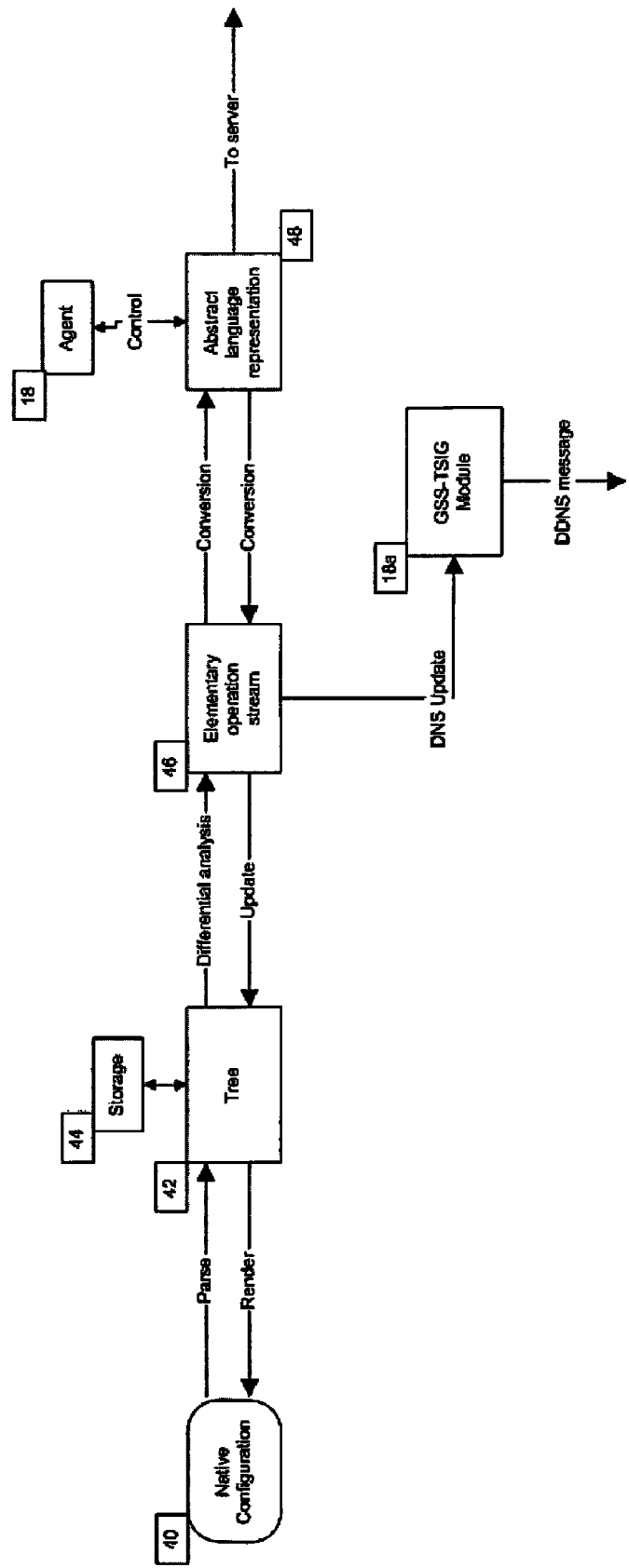
FIG. 3 is a block diagram of a preferred embodiment of the native configuration management of a managed service by an agent module in the management system of FIG. 1.

FIG. 3 illustrates a preferred embodiment of a native configuration management process of a managed service 20 by the corresponding agent module 18. This process is a bidirectional pipe of operations, which allows incremental updating of a native configuration of a managed service 20 to the configuration in standardized representation in database 12, or from the configuration in standardized representation in database 12 to the native configuration of managed service 20.

We will first describe how agent module 18 updates management server 10 as regards native configuration changes.

The native configuration 40—e.g. a configuration describing any IP related service settings such as DHCP or DNS—is parsed by a specific process depending on the kind of configuration container and storage. For example, the configuration may be contained in a plain text file or in a specific binary container accessible through a dedicated API provided by the Operating System of the network device.

As configurations are basically made of a hierarchical set of variables, the parse process is a transformation process which takes a configuration as input, and outputs one or more trees 42. A tree is a hierarchical set of nodes. Each node is preferably a set of triplets—each triplet being made up of a key, a value and flags—describing a variable, its value and specific flags—such as the last modification time used during differential analysis described later—needed by the producer (the agent module 18) and consumer (management server 10) processes.

The trees are stored on permanent support 44—such as a hard disk, or on any non volatile memory support—in any suitable layout, e.g. text files, or binary files using any classical tree representation. This permanent support 44 can be local to the network device running the agent module 18 or remote such as a network drive. This permanent storage 44 allows the agent module 18 to load a configuration at any time, thus allowing host resources sparing, fault or service recovery.

The native configuration management process makes use of elementary operations to describe and to model trees. An elementary operation can be either an add node operation, a delete node operation, or a modify node operation. A sequence of elementary operations replayed in order and applied to an initially empty tree leads to the complete rebuilding of a tree. These elementary operations allow to carry out a differential analysis of two trees.

The differential analysis process takes a tree and extracts information depending on specific parameters, such as absolute time. The output of this process is a set of elementary operations 46, which describe the differences in a tree between two given dates. So, the tree at the older date serves as a reference and applying the set of elementary operations 46 to it provides the tree at the later date. It is preferred that the management server 10 provides the agent module 18 with the identification of the reference state of the tree to be used for the purpose of the differential analysis. This reference state is advantageously the latest state of this configuration in database 12.

Then, agent module 18 causes the set of elementary operations 46 to undergo a conversion process that converts the set of elementary operations to its representation 48 in the abstract language—preferably in the XML language as already mentioned—used by the agent modules 18 for communicating with management server 10. Hence, abstract representation 48 of the set of elementary operations is sent by the agent module 18 to management server 10. As a result, management server 10 updates the corresponding configuration in database 12 based on the received abstract representation 48 by applying the set of elementary operations on the reference state of the tree in database 12.

The conversion process is triggered by external events such as on demand actions, user configurable alarms and timers, or any system event available on the network device hosting the managed service 20.

Figure 4A:
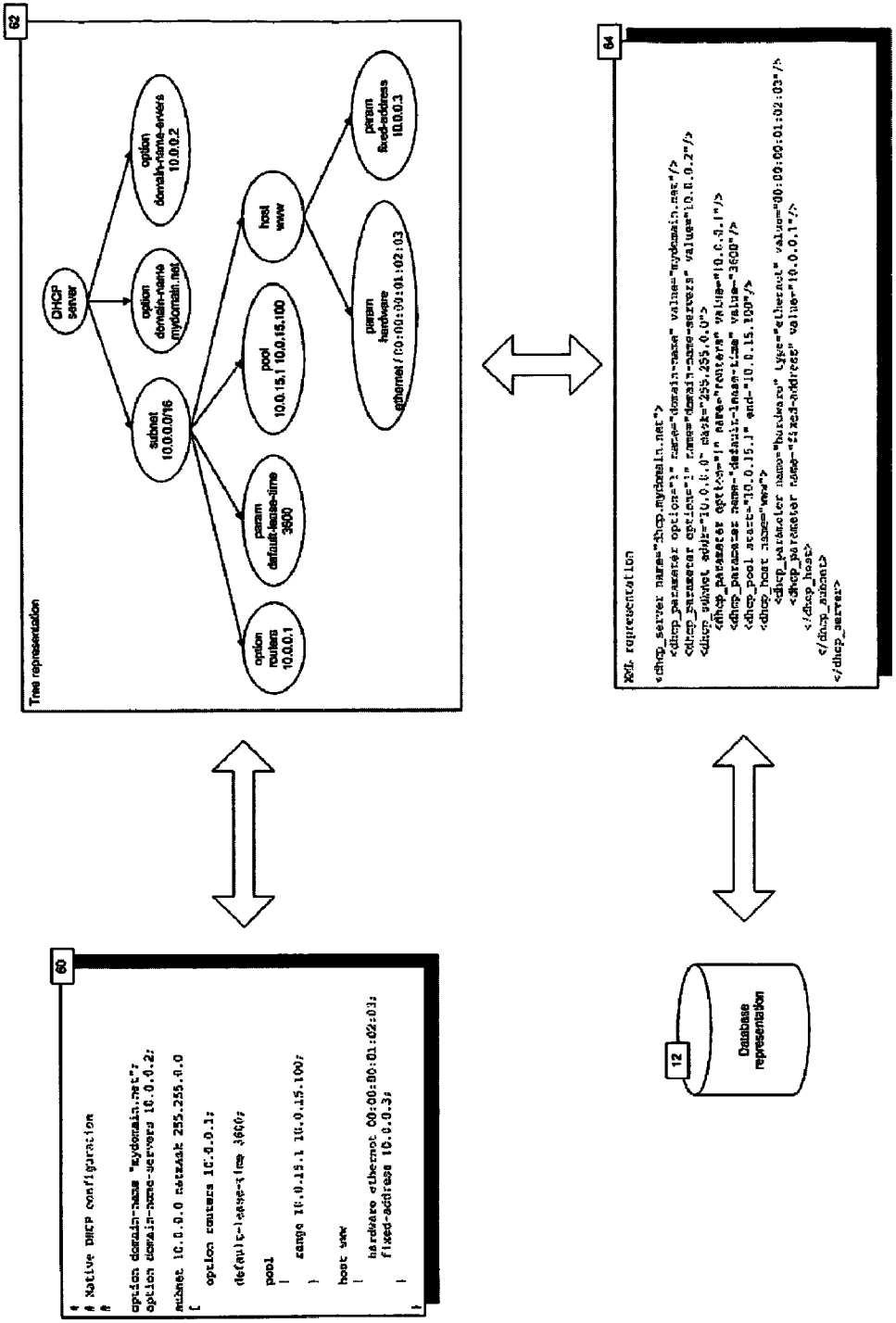
FIGS. 4a and 4b show an example of the steps of the conversion process for a DHCP configuration, respectively a DNS configuration, in native form to an abstract language carried out by an agent module for communication with the management server in the management system of FIG. 1.
Figure 4B:
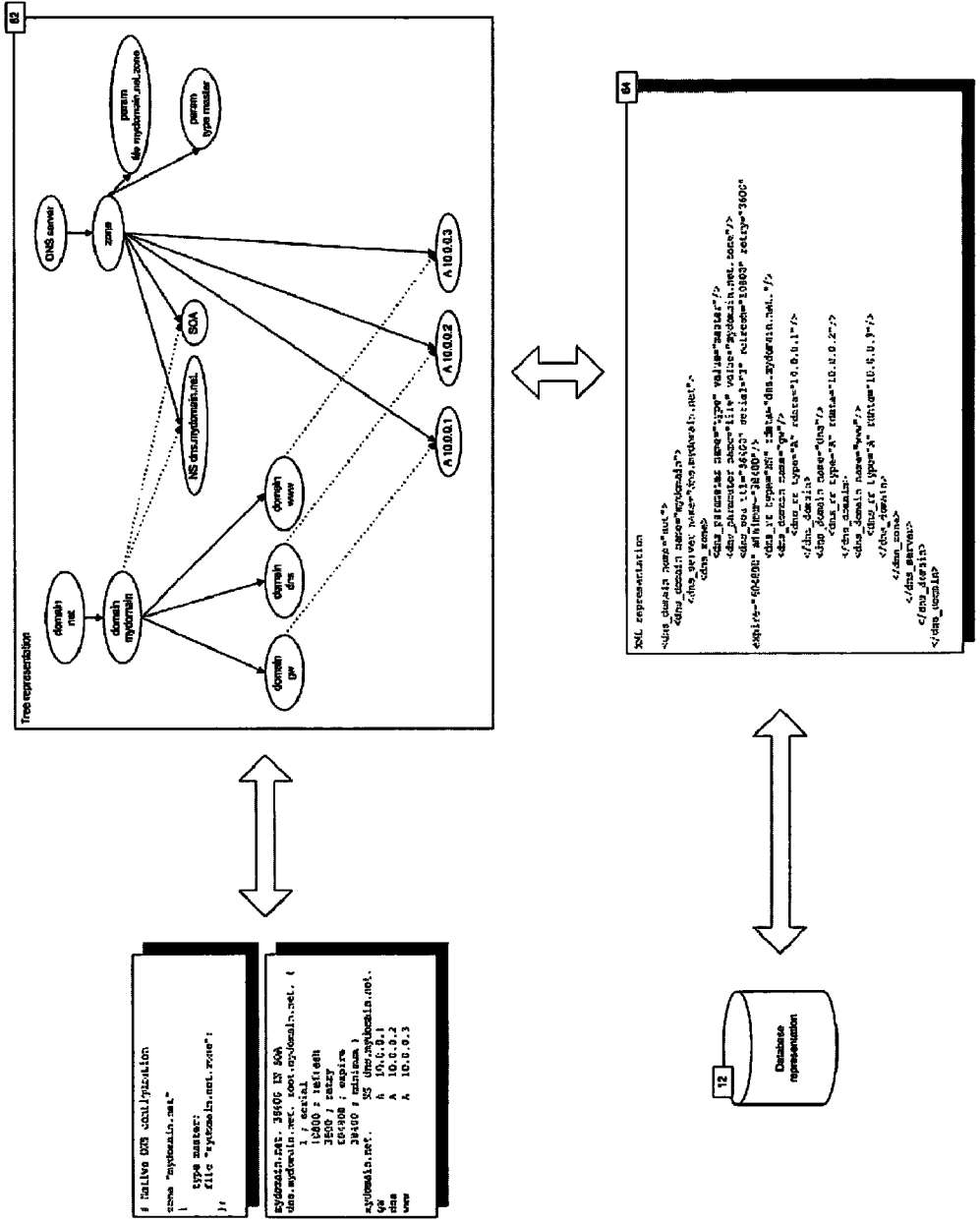

FIG. 4a shows an example of the native configuration management process carried out by the agent module 18 of a DHCP server. The configuration in native form 60 is parsed and transformed into a tree 62. When the differential analysis ends, tree 62 is converted into the set of elementary operations in abstract language representation 64 which is sent to management server 10 to feed database 12. FIG. 4b shows an example of the native configuration management process carried out by the agent module 18 of a DNS server. The configuration in native form 70 is parsed and transformed into a tree 72. When the differential analysis ends, tree 62 is converted into a set of elementary operations in abstract language representation 64 which is sent to management server 10 to feed database 12. FIGS. 4a and 4b show the case of a differential analysis with an empty reference tree, leading to a full representation of tree 62, 72 in the abstract language.

As already mentioned, management server 10 may also instruct an agent module 18 to change the native configuration of a managed service 20 e.g. upon command of a client 16. For this purpose, management server 10 is able to carry out a differential analysis on a configuration tree based on its representation in database 12 and to output a set of elementary operations which describe the differences of this tree between two given states or dates similarly as previously-described for the agent module 18. Here, the tree reference state for the differential analysis is preferably the one corresponding to the actual configuration of the managed service 20 and the other one corresponds to the new state to which the configuration of the managed service is to be changed.

We shall now describe how agent module 18 updates the native configuration of the managed service 20 upon instruction of management server 10. Therefore, agent module 18 is able to carry out the conversion process already described for agent module 18, but the other way round, i.e. it builds an elementary operation stream based on an incoming abstract representation of this stream sent by management server 10.

Then, agent module 18 applies an update process based on the elementary operation stream 46 built from the incoming abstract representation, upon orders from management server 10. This stream is an ordered list of elementary operations which are applied by the agent module 18 in ordered sequence to a corresponding tree in permanent storage 44. As a result, this tree gets synchronized with the corresponding state of the configuration modeled by management server 10 and stored in database 12. If the synchronization of the tree cannot be achieved, e.g. after a network failure, a host failure or any error condition, the agent module 18 resets the tree in permanent storage 44 to an empty tree and requests the whole set of elementary operations from management server 10 so as to enable the agent module 18 to rebuild this tree by applying the update process to the empty tree. When the update process is completed, the tree in permanent storage 44 reflects the corresponding configuration in database 12.

Finally, the agent module 18 carries out a rendering process which is the contrary operation of the parsing process. Herein, a rendering process is a process that takes a tree as input and converts it to the native form in the configuration container of the managed service 20. Rendering actions occur during specific events such as on demand event (for example upon agent control, as requested by the server), user configurable alarms and timers, tree updates or any other event available on the host system.

Figure 5:
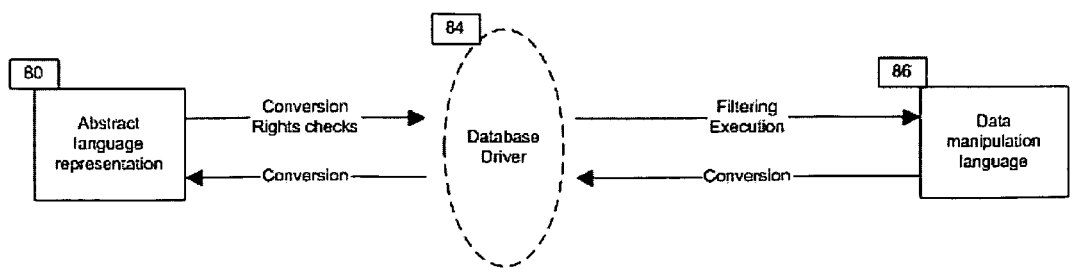
FIG. 5 shows the database management process by the management server in the management system of FIG. 1.

FIG. 5 shows the database management process by management server 10. This process is a bidirectional pipe of operations, which allows complete operation on database 12 by using the abstract language.

When receiving incoming commands and data, management server 10 carries out computation on them such as rights and perimeter checking and filtering, as previously-described. Further, management server 10 converts and executes the incoming commands and data on a variety of storage and processing engines implementing database 12, such as a SQL-compliant database. Therefore, management server 10 converts them from the abstract language, in which they are received, into a data manipulation language 86 of database 12. It will be clear to those skilled in the art that such an architecture allows usage of any kind of storage engine through the use of drivers 84. Usage of SQL-like languages also exhibits the possibility of enforcing the concept of perimeters by filtering accessed data, through the usage of computed filters suitable for the SQL syntax.

After execution of any incoming command, status and results are sent back by management server 10 to the actor that issued the command. Data may include information coming from database 12 which is converted back into the abstract language. Other data may come from any source available to management server 10 such as e.g. system calls, local files, external network connections, and local data of management server 10.

The mentioned incoming commands and data are mainly those received from the clients 16 and from the agent modules 18. In particular, management server 10 receives configuration synchronization information from the agent modules 18 in the form of the set of elementary operations in abstract language as previously described in relation to FIG. 3.

Figure 6A:
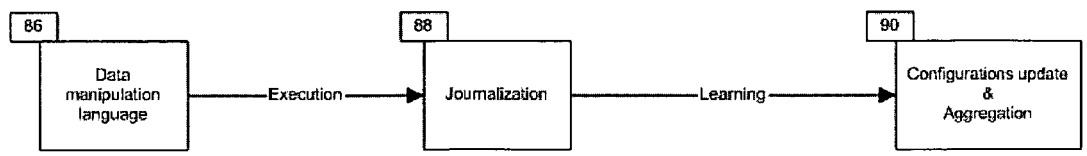
FIG. 6a is a flowchart showing the handling process of managed configurations by the database in the management system of FIG. 1.

FIG. 6a is a flowchart showing the handling process of managed configurations by the database in the management system of FIG. 1.

Management server 10 provides database 12 with configuration data of managed services 20 in the data manipulation language 86. Upon receipt of incoming data, database 12 generates two actions. The first action is the journalization 88 which memorizes any modification made to any data in the configurations of the managed services 20. This first action allows setting up a versioning system enabling a configuration to revert back to some point in the past. The second action is a learning process, which will build an aggregate 90 of the configurations of the managed services 20. This aggregate allows centralized network addressing management. It will be clear to those skilled in the art that both actions are easily performed with the use of a SQL compliant database engine.

Figure 6B:
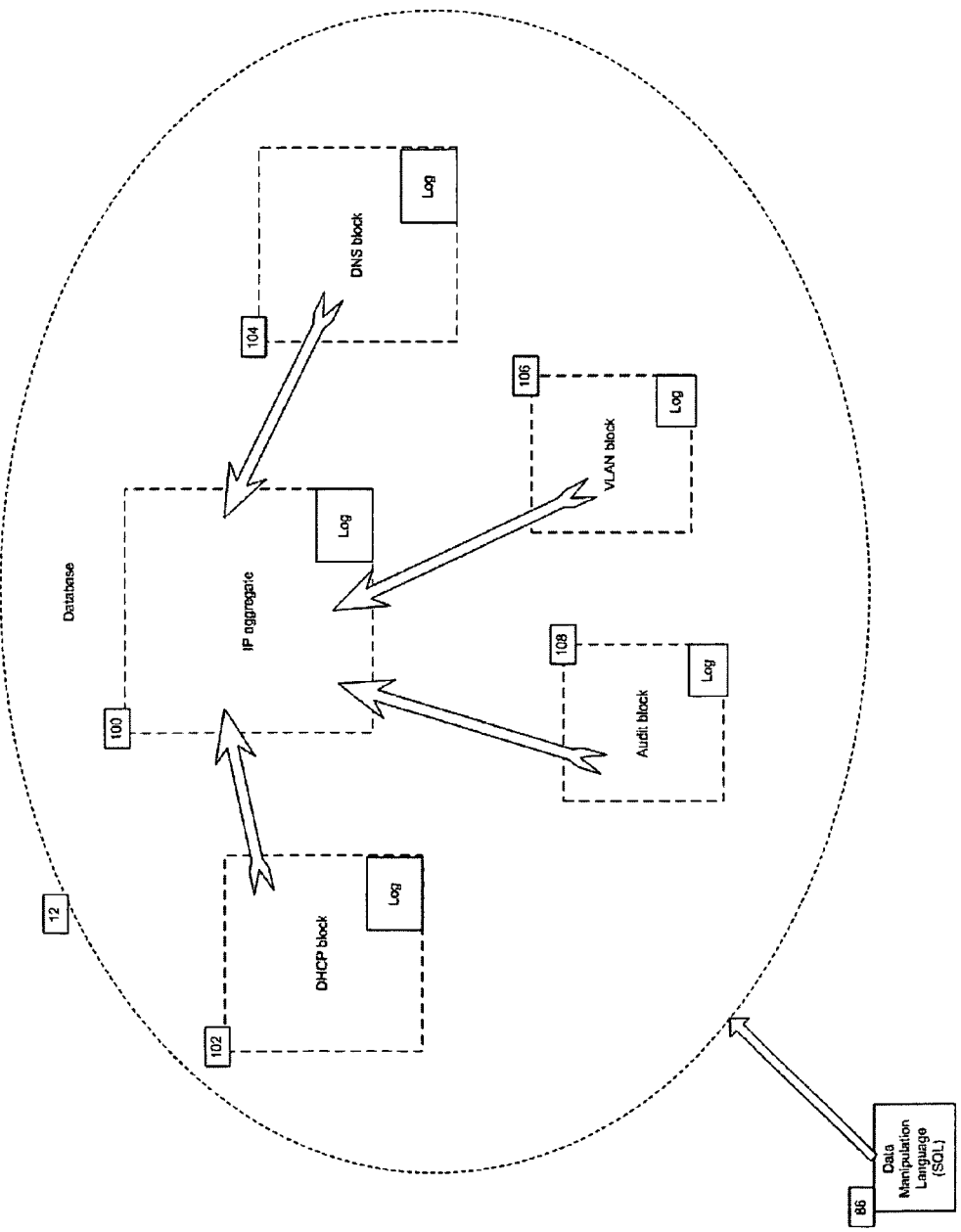
FIG. 6b shows how the configurations of managed services are aggregated in the database in the management system of FIG. 1.

FIG. 6b shows in more detail how aggregation occurs in database 12. The configurations of the managed services 20 are grouped by functional blocks. It is advantageous that a respective functional block corresponds to each class of service, but additional functional blocks may be provided. Example of functional blocks for an IP network are DHCP block 102, DNS block 104, VLAN block 106, audit block 108—audit block 108 contains data about the use of network addresses, in particular IP addresses, by actors; this block can be fed by agent modules 18, connection information available in a managed service 20 such as a domain controller or a user-authentication, etc.—or any other block storing IP related data, including system logs. Each block includes a specific sub-block holding journalization related information. Each block also feeds a main data block 100 which models the aggregate. Aggregate block 100 holds information about all managed services 20 which can correspond to all network-related resources. This information may also be qualified by additional and customizable information.

Data stored in each block representing the configuration of a managed service 20 makes it possible to fully reconstruct the native configuration without any loss of data by the corresponding agent module 18 as previously described. Similarly, any network information which is by nature temporary, e.g. a DHCP lease, may be stored in database 12. This enables immediate recovery of additional qualification data associated with any temporary resource.

Such a way of organizing the database 12 leaves the configuration management system open and scalable. It makes it possible to manage any kind of network services and configurations.

FIG. 7a-7d illustrate the role played by different configuration elements in database feeding when managing an IP network. In this case, database 12 forms a dynamic IP directory and thus, the objects modeled in database 12 are IP based. As network devices are primarily identified by a hard coded identifier i.e. a MAC address, and as IP addresses are logical addresses assigned to those devices, the database will maintain at any time a list of known IP addresses, a list of known MAC addresses, and a list of associations between IP and MAC addresses. The process of discovering addresses and handling their life cycle in the database is discussed below.

As database systems allow associating any kind of data to managed objects, the IP and MAC addresses are both associated with a similar set of information. Typical information is the hardware class of network device, user comments, asset numbers and so on. Network devices are not always provided with the same IP address during their whole life while the MAC address remains almost the same. Typical devices that get successive different IP addresses are mobile devices such as laptops, wireless devices, PDAs, IP based cellphones, and so on. Considering this fact, database 12 implements a process that tries, whenever it is possible, to compute the additional information of an IP address from MAC address information, if an IP/MAC association entry exists. The MAC address list can then be considered as a backing store of information devices that can be updated through either IP object edition, or direct MAC object edition, with automatic update of associated objects based on the IP/MAC relation.

Figure 7A:
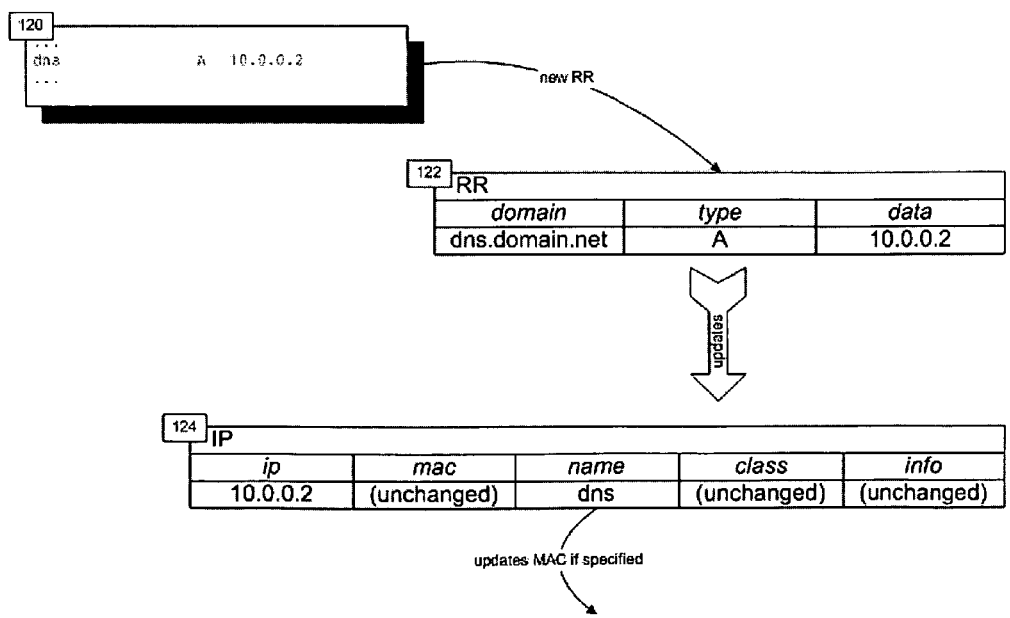
FIG. 7a-7d illustrate the role played by different configuration elements in building up the database.

FIG. 7a shows schematically an example for managed services of the DNS type. All the DNS data are contained in a resource record table 122 in the DNS block of database 12. This DNS data is received in the abstract language by management server 10 from the managed DNS services and stored in database 12 during the synchronization operation of the database 12 with this DHCP service. Further, the IP aggregate 100 of database 12 comprises an IP table 124 which contains related information for each IP address, the related information being mainly the MAC address and the hostname allocated to the corresponding network service by the managed DNS service. It may also contain other information such as "class" identifying the type of that network service e.g. workstation, printer, router or switch or "info" which is a field freely available to the user. When a change occurs in a DNS service 120, database 12 is updated with this change, more precisely resource record table 122 is updated as well as IP table 124 in which the IP entry corresponding to the DNS entry is accordingly created or updated.

Figure 7B:
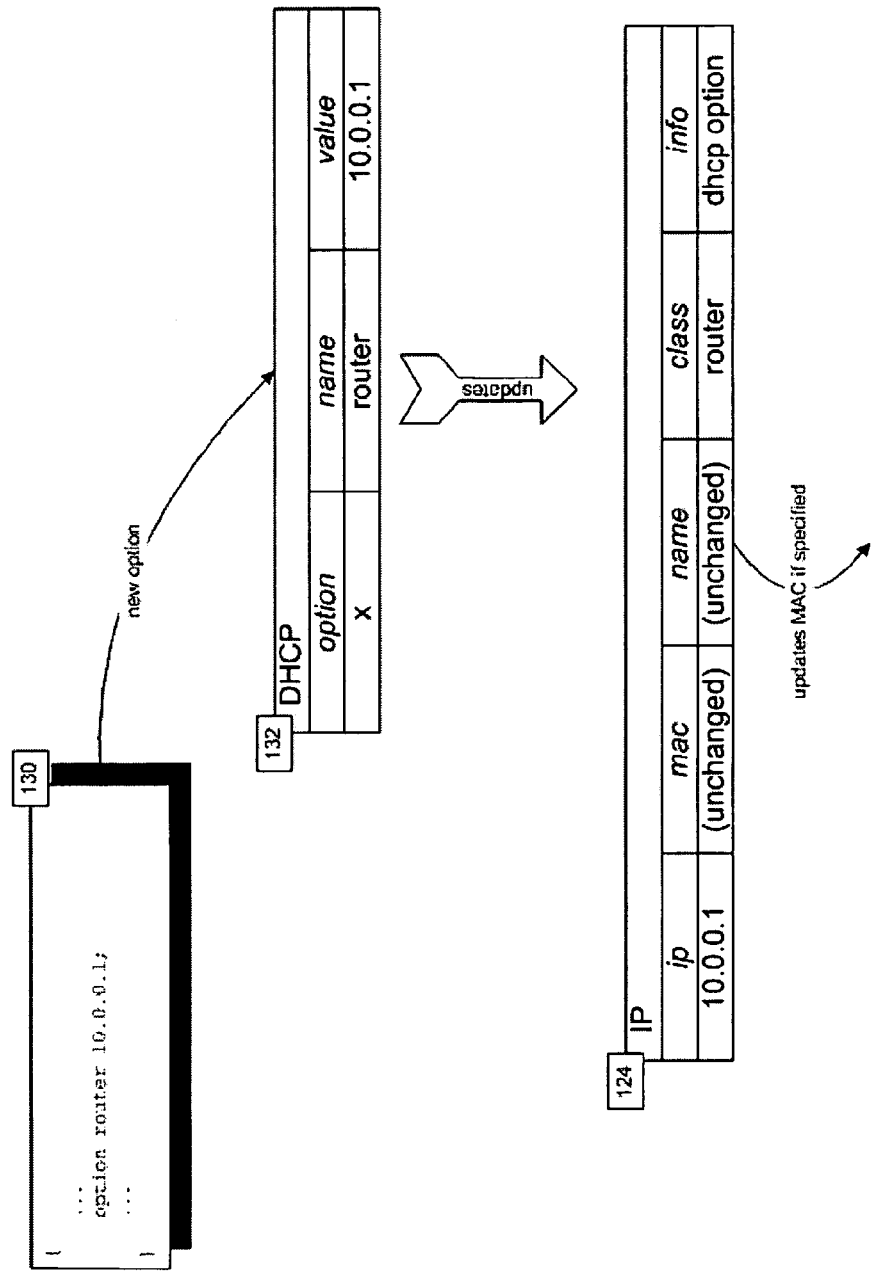

FIG. 7b shows schematically an example for managed services of the DHCP type. All the DHCP data are contained in a DHCP table 132 in the DHCP block of database 12. These DHCP data are received in the abstract language by management server 10 from the managed DHCP services and stored in database 12 as already described. When a change occurs in a DHCP service 130, database 12 is updated with this change during the synchronization operation of the database 12 with this DHCP service. More precisely DHCP table 132 is updated as well as IP table 124 in which the IP entry corresponding to the DHCP entry is accordingly created or updated.

Figure 7C:
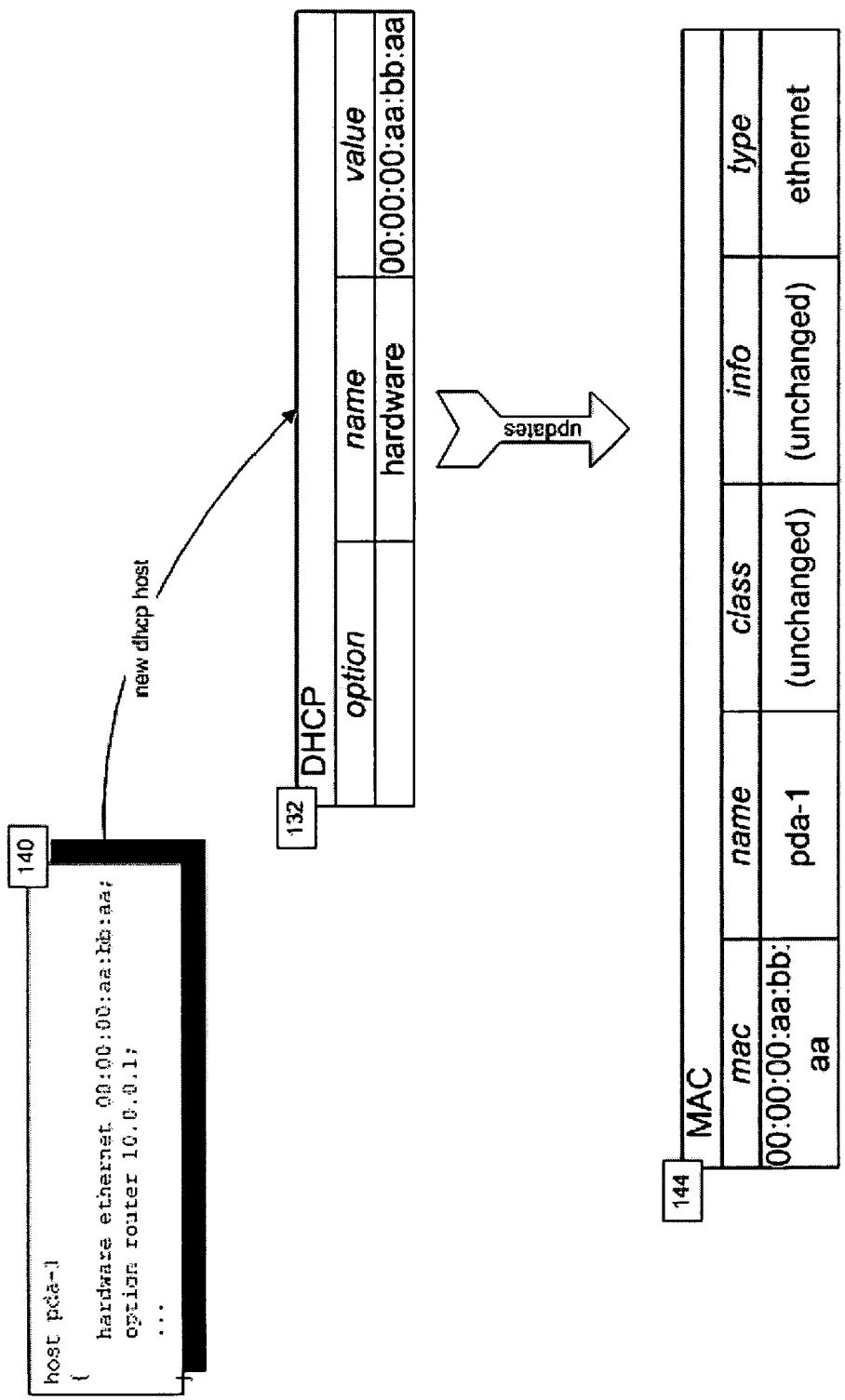

Both in FIG. 7a and in FIG. 7b, the IP table 124 may in turn update or create a MAC table 144—shown in FIG. 7c—if the updated entry in IP table 124 specifies a MAC address.

FIG. 7c shows schematically an example of a database update for a PDA 140—i.e. a personal digital assistant—based on the declaration in the DHCP service native configuration. All the static configurations of DHCP services are contained in the DHCP table 132 in the DHCP block of database 12. When the agent 18 synchronizes the DHCP service 20 configuration with database 12 through management server 10, the DHCP table 132 is updated with the name of the PDA and its MAC address. Database 12 also contains a MAC table 144 which is in turn updated with a new entry corresponding to PDA 140 and the corresponding name. The MAC table also contains other related information similar as to those in IP table 124 as already mentioned in relation to FIG. 7a.

Figure 7D:
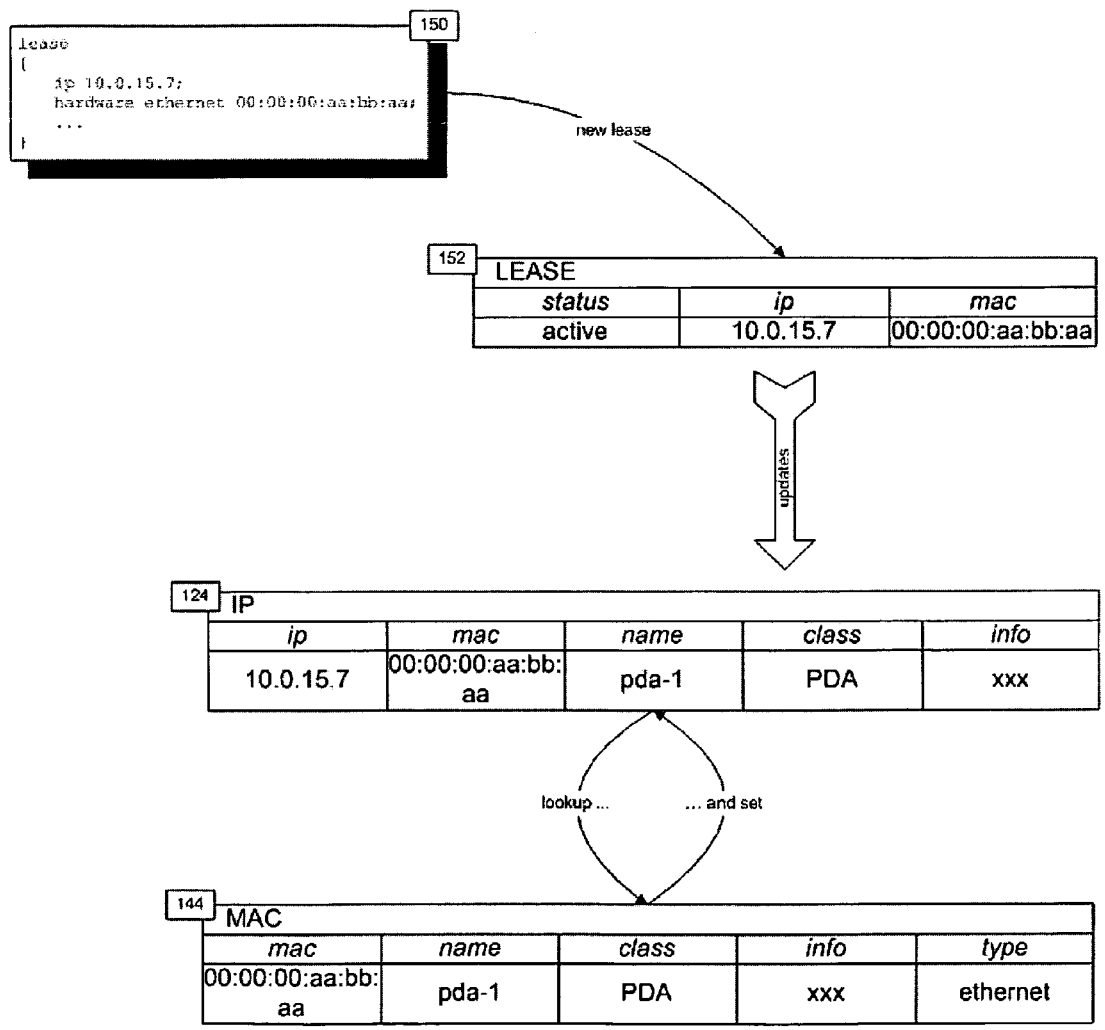

FIG. 7d shows schematically the update of database 12 once the DHCP service issues a lease 150 to PDA 140 of FIG. 7c. All the lease data is contained in a lease table 152 in the DHCP block of database 12. Lease table 152 contains both the MAC address of the PDA and the IP address assigned to this PDA. The lease data is received in the abstract language by management server 10 from the managed DHCP services and stored by the latter in database 12 in the way already described. Here, database 12 is updated with lease 150, more precisely a new entry is accordingly added to lease table 152. IP table 124 is updated in turn with the corresponding MAC address in lease table 152 and, based on the MAC address, IP table 124 is further updated with the name assigned to it as found in MAC table 144. When no entry is found in the MAC table 144, one is created and associated with the entry in table IP 124.

Generally speaking, when specific events lead to changes in the configuration of a managed service 20, the corresponding agent module 18 detects them and informs management server 10 thereof in the way already described. Management server 20 in turn updates database 12. Such events can be e.g. a DHCP lease assignment, renewal or release, a DHPC static reservation, a DNS record edition. These events eventually lead to either IP or MAC objects creation, update or deletion in database 12. When the original event triggers an IP/MAC association update, such as a DHCP lease assignment as shown in FIG. 7d, a lookup on MAC objects is performed, that will allow the IP object to inherit data associated with the MAC object. Depending on the event, only part of the information may be available. For example, as shown on FIG. 7a, the creation of a DNS record of type A will only allow the creation of an IP object associated with a hostname. In FIG. 7b, the creation of a DHCP option may only allow the creation of an IP object associated with a class or role, which in turn updates a potential MAC object if one is associated with the edited IP object. Some events such as DHCP host description shown in FIG. 7c, can provide only a MAC address that will trigger MAC object creation that may be referenced by future IP objects. Those examples are only a subset of the possible combinations offered by the managed services 20 configuration modeling.

Figure 8:
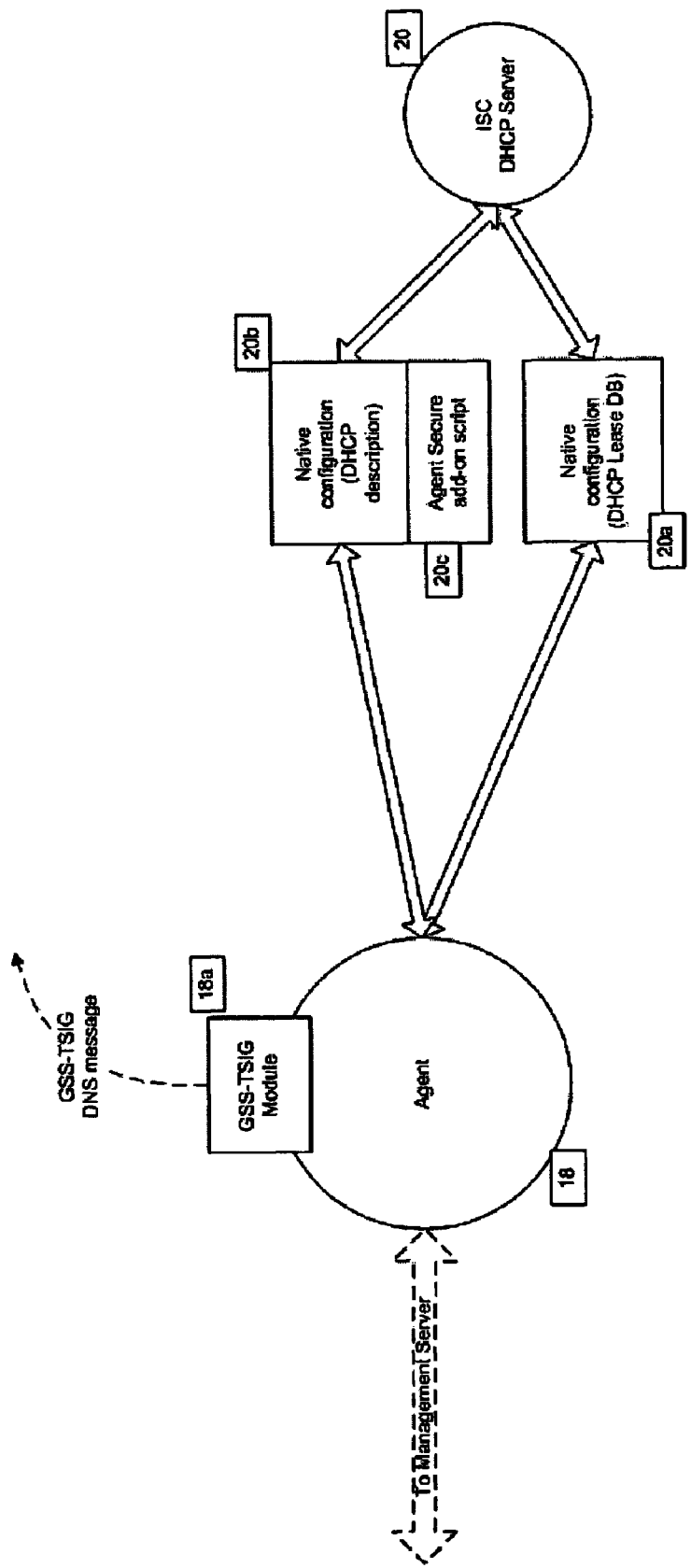
FIG. 8 illustrates a particular method which can be implemented in the configuration management system of FIG. 1 for allowing incompatible naming and addressing systems to interact in a secure way.

FIG. 8 illustrates a particular method which can be implemented in the configuration management system for allowing incompatible naming and addressing systems to interact in a secure way. As protocols such as DHCP allow mobile equipment to always be connected to any network, they suffer from a major drawback due to the fact they do not always have the same network address. Network equipment must then update their name(s) in the DNS system to reflect an up-to-date address/name mapping. Such updates are done in a secured way, using specific security protocols such as TSIG, i.e. Secret Key Transaction Authentication for DNS as defined in RFC 2845. This tightly binds the DNS and DHCP implementations. Companies providing DNS and DHCP software products do not provide compatibility with the software products of other companies. At the present time, only two protocols are used in the world: TSIG which is used by ISC (Internet Software Consortium) products—covering Unix like operating systems—and GSS-TSIG which is used by Microsoft® products—covering Windows® operating systems. A DHCP made by the ISC is not able to securely update a DNS made by Microsoft®, despite the fact that such a combination is commonly found in networks. To overcome this drawback, a gateway between incompatible systems is provided using one of those secured protocols, such as GSS-TSIG.

Using the scalability features of the ISC implementation of the DHCP service, a small software script 20c is inserted in the native configuration 20b of the DHCP service 20, more precisely in the DHCP description section of the native configuration. The description section specifies what data a DHCP service can provide to clients. Script 20c is written using standard DHCP configuration semantics, and configures the DHCP service to record information when DHCP lease activity occurs. This information is stored in the native configuration 20a of the DHCP service, more precisely in the DHCP lease database section of the native configuration. The information is stored by the DHCP service itself and without disturbing its normal routine. The DHCP lease database section contains data emitted by the DHCP service to all known DHCP clients. The recorded information includes the names and commands computed by the script. The recorded information is read and used by a lease data consumer process, more particularly a GSS-TSIG module 18a, which generates DNS secured update messages using the GSS-TSIG protocol (Generic Security Service Algorithm for Secret Key Transaction Authentication for DNS—see RFC3645). These messages are directed toward a DNS service that understands the secured protocol used, such as a Microsoft® DNS server. These messages will either add, modify or delete network address/name associations in the DNS service. These messages can be sent to the DNS service without the intermediary of management server 10.

This possibility is also illustrated in FIG. 3 in which the pipe of operations includes the specific module providing the GSS-TSIG functionality. GSS-TSIG module 18a is responsible for the DNS update message generation. Elementary operation stream 46 is checked for operations triggering DNS update messages generation.

GSS-TSIG module 18a can be part of agent module 18, but such module may also be used independently from agent module 18, i.e. independently from the remote configuration management system.

Further, one will understand that this particular method described in reference to FIG. 8 is advantageous because it does not use resources from management server 10 as information is directly given from the DHCP service to the DNS service. Alternatively, the DNS service could be updated with the required DHCP information by management server 10 via the respective agents 18.

The invention has been described with reference to preferred embodiments. However, many variations are possible within the scope of the invention.

So, although not required, the communication channels between management server 10 and database 12, directory 14, clients 16 and agent modules 18 may provide encryption and authentication methods to enforce security of the system.

The configuration management system of the invention, when applied to an IP network, offers a dynamic IP Directory which can provide a real time image of the IP addresses of a company. It helps companies to automatically configure, integrate and administer IP services across their entire business. The configuration management system simplifies operations, centralizes network control and reduces administrative expense across the entire network locally and globally. The configuration management system can be implemented with a variety of platforms, including Microsoft® Windows®, Unix® and Linux®. Further, the configuration management system is adaptive.

The invention claimed is:

1. A network service configuration management system for network addressing management by remotely managing the configuration of at least one network service, comprising:
    a management server;
    a database for forming a dynamic network address directory by storing a representation of the configuration of the network service
    an agent software component for accessing to the configuration in a native language of the network service
wherein:
    the management server is adapted to access to the database;
    the management server and the agent software component are adapted to communicate synchronization information to each other and to synchronize the representation of the configuration of the network service in the database and the native language configuration of the network service with each other based on the synchronization information, the synchronization information being in a language different from the native language of the configuration of the network service;

wherein the agent software component is adapted to convert the configuration in native language of the network service into a tree representation;

wherein the agent software component is adapted to make a differential analysis of the configuration in tree representation between a new state and an older state and to provide a stream of elementary operations allowing a tree representation of the configuration in the new state to be built up by applying the stream of elementary operations to the tree representation of the configuration in the older state.

2. The system according to claim 1, wherein the agent software component runs on a network device distinct from the management server.

3. The system according to claim 2, wherein the network service is provided by the network device on which the agent software component is run.

4. The system according to claim 1, wherein the agent software component runs on the management server.

5. The system according to claim 1, wherein the synchronization information defines the differences in configuration between a new state and an older state.

6. The system according to claim 1, wherein the agent software component is adapted to convert a stream of elementary operations into the language of the synchronization information for communication to the management server.

7. The system according to claim 1, wherein the agent software component is adapted to convert the configuration of the network service in tree representation into the native language of the network service.

8. The system according to claim 7, wherein the management server is adapted to communicate to the agent software component synchronization information containing a stream of elementary operations enabling the agent software component to build up the tree representation of the configuration in a new state by applying the stream of elementary operations to the tree representation of the configuration in an older state.

9. The system according to claim 1 for IP addressing management, wherein:
the at least one network service is one among a DNS service, a DHCP service or a VLAN service; and
the database is adapted to form a dynamic IP network address directory by storing a representation of the configuration of the network service.

10. The system according to claim 1, for network addressing management by remotely managing the configuration of a plurality of network services, comprising:
a plurality of agent software components;
wherein:
the database is adapted to form a dynamic network address directory by storing a representation of the configuration of the plurality of network services;
each agent software component has access to the configuration in native language of a respective network service; and
the management server and each agent software component are adapted to communicate synchronization information to each other and to synchronize the configuration in native language of the respective network service and the representation of the configuration of the respective network service in the database with each other based on said synchronization information, said synchronization information being provided in a language different from the native language of the configuration of the respective network service; and
wherein:
the plurality of network services have different native configuration languages; and
said synchronization information communicated by the management server and the plurality of agent software components is in a same language.

11. The system according to claim 1, comprising:
a DNS service provided by a DNS server;
a DHCP service provided by a DHCP server distinct from the DNS server;
a software script inserted in the native configuration of the DHCP service and which:
reads data in the native configuration of the DHCP service; and
computes and records address/name mapping information into the native configuration of the DHCP service based on read data; and
a software module preferably of the GSS-TSIG type, said software module running on the DHCP server and which:
reads the address/name mapping information recorded by the software script in the native configuration of the DHCP service; and
sends messages to the DNS service for securely updating it, the messages being computed by the software module based on the read address/name mapping information.

* * * * *

UNITED STATES PATENT AND TRADEMARK OFFICE
CERTIFICATE OF CORRECTION

PATENT NO. : 8,037,164 B2  
APPLICATION NO. : 12/085653  
DATED : October 11, 2011  
INVENTOR(S) : Draca et al.

Page 1 of 1

It is certified that error appears in the above-identified patent and that said Letters Patent is hereby corrected as shown below:

Title Page;  
(30) Foreign application Priority Data:  
delete "Nov. 29, 2005 (EP) 05292523"  
replace with --Nov. 29, 2005 (EP) 05292523.7--

Signed and Sealed this  
Seventh Day of May, 2013

Teresa Stanek Rea  
*Acting Director of the United States Patent and Trademark Office*